US006847912B2

(12) United States Patent
Forster

(10) Patent No.: US 6,847,912 B2
(45) Date of Patent: Jan. 25, 2005

(54) RFID TEMPERATURE DEVICE AND METHOD

(75) Inventor: Ian J. Forster, Essex (GB)

(73) Assignee: Marconi Intellectual Property (US) Inc., Itasca, IL (US)

( * ) Notice: Subject to any disclaimer, the term of this patent is extended or adjusted under 35 U.S.C. 154(b) by 0 days.

(21) Appl. No.: 10/422,631

(22) Filed: Apr. 24, 2003

(65) Prior Publication Data

US 2004/0041714 A1 Mar. 4, 2004

Related U.S. Application Data

(60) Provisional application No. 60/378,384, filed on May 7, 2002.

(51) Int. Cl.[7] ............................. G08C 19/12; G08B 5/22; H04Q 5/22
(52) U.S. Cl. ..................... 702/130; 222/1; 340/10.1; 340/870.17; 713/320
(58) Field of Search .................. 702/99, 130, 122, 702/188; 340/10.33, 10.1, 10.41, 603, 870, 17; 221/1; 713/320

(56) References Cited

U.S. PATENT DOCUMENTS

| | | | |
|---|---|---|---|
| 3,779,418 A | 12/1973 | Davis | 220/60 |
| 3,787,993 A | 1/1974 | Lyon | 40/306 |
| 3,817,417 A | 6/1974 | Edwards | 217/37 |
| 3,930,593 A | 1/1976 | Ragettli | 220/276 |
| 3,934,749 A | 1/1976 | Andrulionis | 220/63 R |
| 3,961,323 A | 6/1976 | Hartkorn | 340/280 |
| 4,343,325 A | 8/1982 | Fallon | 137/212 |
| 4,384,289 A | 5/1983 | Stillwell et al. | 340/870.17 |
| 4,630,044 A | 12/1986 | Polzer | 340/825.72 |
| 4,736,926 A | 4/1988 | Fallon et al. | 251/149.9 |
| 4,744,162 A | 5/1988 | Okazaki | 40/312 |
| 4,862,160 A | 8/1989 | Ekchian et al. | 340/825.54 |
| 4,944,363 A | 7/1990 | Osher et al. | 273/58 A |
| 4,975,711 A | 12/1990 | Lee | 343/702 |
| 5,021,767 A | 6/1991 | Fockens | 340/572 |

(List continued on next page.)

FOREIGN PATENT DOCUMENTS

| | | |
|---|---|---|
| DE | 44 46 203 A1 | 6/1996 |
| DE | 295 04 712 U | 7/1996 |
| DE | 197 03 819 C1 | 8/1998 |
| FR | 2681972 A | 4/1993 |
| GB | 974 249 A | 11/1964 |
| GB | 2 092 096 A | 8/1982 |
| GB | 2 210 349 A | 6/1989 |
| GB | 2 293 588 A | 4/1996 |
| WO | WO 94/05090 | 3/1994 |
| WO | WO 95/15622 | 6/1995 |
| WO | WO 99/18000 | 4/1999 |

Primary Examiner—John Barlow
Assistant Examiner—John H Le
(74) Attorney, Agent, or Firm—Withrow & Terranova, PLLC

(57) ABSTRACT

A remote communication device, that receives temperature indicia concerning a container and/or its contents and communicates such temperature indicia along with an identification indicia to a reader. The remote communication device can measure and communicate temperature indicia associated with a container in a periodic manner. The remote communication device can also measure and communicate temperature indicia associated with a container when such temperature indicia exceed a certain minimum or maximum threshold temperature. The remote communication device can also include power circuitry to store energy when energized in the range of an interrogation reader so that the remote communication device can be powered for temperature indicia measurements when not in the range of an interrogation reader.

121 Claims, 11 Drawing Sheets

U.S. PATENT DOCUMENTS

| | | | |
|---|---|---|---|
| 5,057,844 A | 10/1991 | Rothstein | 342/51 |
| 5,151,684 A | 9/1992 | Johnsen | 340/572 |
| 5,161,892 A | 11/1992 | Shigezawa et al. | 374/179 |
| 5,190,504 A | 3/1993 | Scatterday | 482/49 |
| 5,326,939 A | 7/1994 | Schafer | 177/139 |
| 5,396,218 A | 3/1995 | Olah | 340/572 |
| 5,448,220 A | 9/1995 | Levy | 340/539 |
| 5,491,483 A | 2/1996 | D'Hont | 342/42 |
| 5,524,750 A | 6/1996 | Miller | 206/767 |
| 5,564,166 A | 10/1996 | Roy | 24/3.11 |
| 5,585,953 A | 12/1996 | Zavrel | 359/152 |
| 5,609,406 A | 3/1997 | Cejnek | 362/61 |
| 5,619,207 A | 4/1997 | D'Hont | 342/42 |
| 5,621,913 A | 4/1997 | Tuttle et al. | 455/90 |
| 5,631,631 A | 5/1997 | Deschenes | 340/572 |
| 5,648,765 A | 7/1997 | Cresap et al. | 340/825.35 |
| 5,663,630 A | 9/1997 | Koziatek | 320/49 |
| 5,696,485 A | 12/1997 | Treharne | 340/505 |
| 5,767,772 A | 6/1998 | Lemaire | 340/571 |
| 5,767,792 A | 6/1998 | Urbas et al. | 340/870.17 |
| 5,779,839 A | 7/1998 | Tuttle et al. | 156/213 |
| 5,781,112 A | 7/1998 | Shymko | 340/572 |
| 5,790,029 A | 8/1998 | Curnutte et al. | 340/572 |
| 5,798,693 A | 8/1998 | Engellenner | 340/505 |
| 5,831,531 A | 11/1998 | Tuttle | 340/572 |
| 5,833,603 A | 11/1998 | Kovacs et al. | 600/317 |
| 5,842,118 A | 11/1998 | Wood, Jr. | 455/101 |
| 5,864,580 A | 1/1999 | Lowe et al. | 375/222 |
| 5,865,339 A | 2/1999 | Carlson | 220/694 |
| 5,883,376 A | 3/1999 | Rosch et al. | 235/492 |
| 5,887,176 A * | 3/1999 | Griffith et al. | 713/320 |
| 5,905,444 A | 5/1999 | Zimmer | 340/825.31 |
| 5,926,013 A | 7/1999 | Brandt | 323/370 |
| 5,936,523 A | 8/1999 | West | 340/545.6 |
| 5,939,977 A | 8/1999 | Monson | 340/442 |
| 5,947,256 A | 9/1999 | Patterson | 194/209 |
| 5,953,682 A | 9/1999 | McCarrick et al. | 702/45 |
| 5,959,524 A | 9/1999 | Wienand et al. | 338/28 |
| 5,961,215 A | 10/1999 | Lee et al. | 374/178 |
| 5,963,177 A | 10/1999 | Tuttle et al. | 343/872 |
| 5,972,156 A | 10/1999 | Brady et al. | 156/280 |
| 5,973,611 A | 10/1999 | Kulha et al. | 340/825.31 |
| 5,986,569 A | 11/1999 | Mish et al. | 340/825.54 |
| 6,008,727 A | 12/1999 | Want et al. | 340/572.1 |
| 6,012,415 A | 1/2000 | Linseth | 119/174 |
| 6,023,244 A | 2/2000 | Snygg et al. | 343/700 MS |
| 6,031,459 A | 2/2000 | Lake | 340/572.8 |
| 6,078,259 A | 6/2000 | Brady et al. | 340/572.7 |
| 6,138,058 A | 10/2000 | Van Antwerp, Jr. et al. | 700/225 |
| 6,147,604 A | 11/2000 | Wiklof et al. | 340/572.1 |
| 6,204,764 B1 | 3/2001 | Maloney | 340/568.1 |
| 6,206,282 B1 | 3/2001 | Hayes, Sr. et al. | 235/375 |
| 6,347,723 B1 * | 2/2002 | Barlian et al. | 222/1 |
| 6,402,690 B1 | 6/2002 | Rhee et al. | 600/300 |
| 6,469,627 B1 | 10/2002 | Forster et al. | 340/572.8 |
| 6,483,473 B1 | 11/2002 | King et al. | 343/767 |
| 6,501,435 B1 | 12/2002 | King et al. | 343/795 |
| 6,563,417 B1 * | 5/2003 | Shaw | 340/10.1 |
| 6,580,357 B1 * | 6/2003 | Forster et al. | 340/10.1 |

* cited by examiner

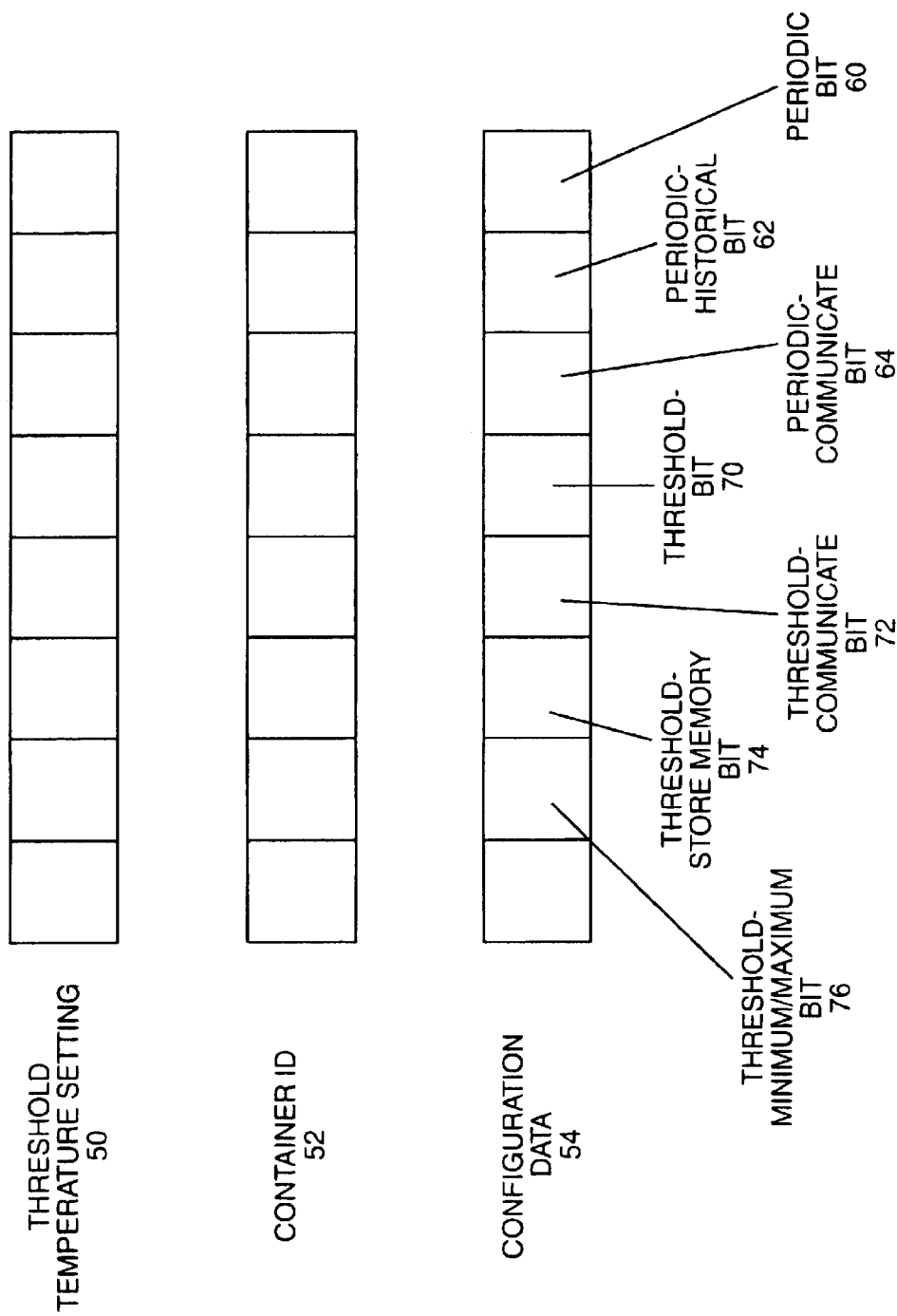

RFID TEMPERATURE DEVICE AND METHOD

RELATED APPLICATION

This application claims priority and the benefit of U.S. Provisional Patent Application Ser. No. 60/378,384 filed May 7, 2002, which is incorporated by reference herein in its entirety.

BACKGROUND OF THE INVENTION

It is often necessary to monitor the temperature of containers and materials contained within containers that are manufactured in and distributed through a manufacturing or shipping facility. Creation of certain materials, such as liquids or chemicals, often require that certain factors in the environment in which they are created are controlled in a stringent manner to ensure that the materials are created properly and with the necessary quality. Variables in the environment, such as temperature, can have a substantial bearing on whether or not the materials are being manufactured properly and distributed in the proper manner.

In particular, the temperature of either the container itself or the materials contained in the container needs to be ascertained during the distribution and/or shipping process to ensure that the correct environment temperature is being maintained. It may be that a precise temperature at a particular point in the distribution channel is required, or that the environment temperature remains within a certain acceptable range. For example, if the container is a keg containing beer, the temperature of the beer may need to be at a certain specific temperature or within a certain temperature range to ensure that the brewing process and/or subsequent transport of the beer is performed according to specifications for the process and quality control.

Another problem is that the temperature of the container and/or its contents is manually ascertained in certain processes. In such processes, an operator must measure the temperature of either each container or a sample of its contents to ensure that it is proper. Because distribution facilities distribute large volumes of containers, it is usually not feasible for an operator to check each container and/or its contents for temperature. Instead, operators test samples. As with all sampling methods, there is chance for error. The sample measured may have the correct temperature, but another sample that was not measured may not have the correct temperature.

There exists a need for a communication device to be associated with the container that can measure the temperature of the container and/or its contents and to remotely communicate this temperature during the distribution process. In order to properly communicate the temperature associated with a particular container, it is also necessary that the remote communication device be able to communicate an identification indicia to identify a particular container from others. The remote communication device associated with the container would cross the range of an interrogation reader along the distribution and/or shipping process whereby temperature indicia and/or an identification indicia associated with the container can be communicated.

Temperature measurements may need to be made periodically by the remote communication device so that the temperature is measured throughout at various times. The temperature measured may need to be communicated immediately or simply be recorded in the remote communication device for a later historical analysis.

Temperature measurements may need to be made to determine whether or not the temperature associated with a container exceeds a certain level or falls below what is required. If the temperature is above an acceptable maximum level or the temperature falls below an acceptable minimum level, the materials contained within the container may be substandard. This information is communicated so that this particular container can be pulled from distribution or further inspected for quality and acceptability.

Yet another problem exists in that the remote communication device may not have its own power source. If a remote communication device does not have its own power source, such as a battery, and it is not in the range of an interrogation reader such that it is energized for energy, the remote communication device cannot perform temperature measurements that are required when the remote communication device in outside the range of an interrogation reader. For example, periodic temperature measurement may be required at times when the remote communication device is not in the range of an interrogation reader. Temperature readings below a minimum threshold and/or above a maximum threshold may occur at any time and not just when the remote communication device is in the range of an interrogation reader.

SUMMARY OF THE INVENTION

The present invention relates to a remote communication device that receives temperature indicia concerning a container and/or its contents and communicates information such as the temperature indicia and/or an identification indicia to an interrogation reader. The remote communication device can be attached to a container so that the temperature sensor measures temperature indicia about the container or its contents.

The remote communication device includes a control system, wireless communication electronics, and a temperature sensor. The control system manages the operations and control of the remote communication device and receives temperature indicia measured by the temperature sensor. The control system comprises control circuitry for managing the operations of the remote communication device and memory for storage of information such as temperature indicia. The wireless communication electronics are adapted to facilitate communication between the remote communication device and an interrogation reader to pass such communications to the control system. The wireless communication electronics can also receive communications from the control system to be communicated remotely to an interrogation reader.

In one embodiment of the present invention, communication of temperature indicia and/or an identification indicia between the interrogation reader and remote communication device is achieved when the interrogation reader emits an electronic signal through an antenna. If the remote communication device is in the range of the signal, its wireless communication electronics decipher the message and send it to the control system for handling. If the remote communication device does not have its own power source, the remote communication device can communicate back to the interrogation reader by altering the interrogation reader's electronic signal.

In another embodiment, the remote communication device includes power circuitry that stores power when the remote communication device is in the range of the interrogation reader. Since some remote communication devices do not have their own power source, the energy stored in the power circuitry allows the remote communication device to provide its own energy to measure temperature indicia at times when the remote communication device is not in the range of the reader.

The remote communication unit may determine the temperature of the container and/or its contents by including a temperature sensor or providing temperature sensing techniques.

In a first temperature sensing embodiment, a temperature sensor is provided in thermal contact with the container and/or its contents.

In another temperature sensing embodiment, the remote communication device may include a discharge capacitor determine temperature of the container and/or its contents by measuring the discharge of energy stored by the remote communication device in the discharge capacitor during a given period of time.

In another temperature sensing embodiment, the interrogation reader is able to determine the temperature of the remote communication device and correlate it to the temperature associated with the container and/or its contents by determining a frequency at which the remote communication device has maximum energy absorption relative to a calibrated frequency rate for maximum energy absorption at a known temperature.

In a first mode of operation, the remote communication device can be configured to receive temperature indicia from the temperature sensor periodically so that temperature indicia associated with the container is known for different points in time in the past. The remote communication device can be configured to communicate the periodic temperature indicia immediately or store the periodic temperature indicia in memory for later communication.

In a second mode of operation, the remote communication device can be configured to communicate temperature indicia from the temperature sensor only if a threshold temperature setting is exceeded. A minimum and/or maximum temperature setting is configured such that the remote communication device communicates a threshold occurrence when either the temperature indicia received from the temperature sensor exceeds the maximum temperature setting or falls below the minimum temperature setting or both.

BRIEF DESCRIPTION OF THE DRAWINGS

FIG. 6 is a schematic diagram of a container ID byte and configuration data byte for the preferred embodiment;

DETAILED DESCRIPTION OF THE INVENTION

Figure 1:
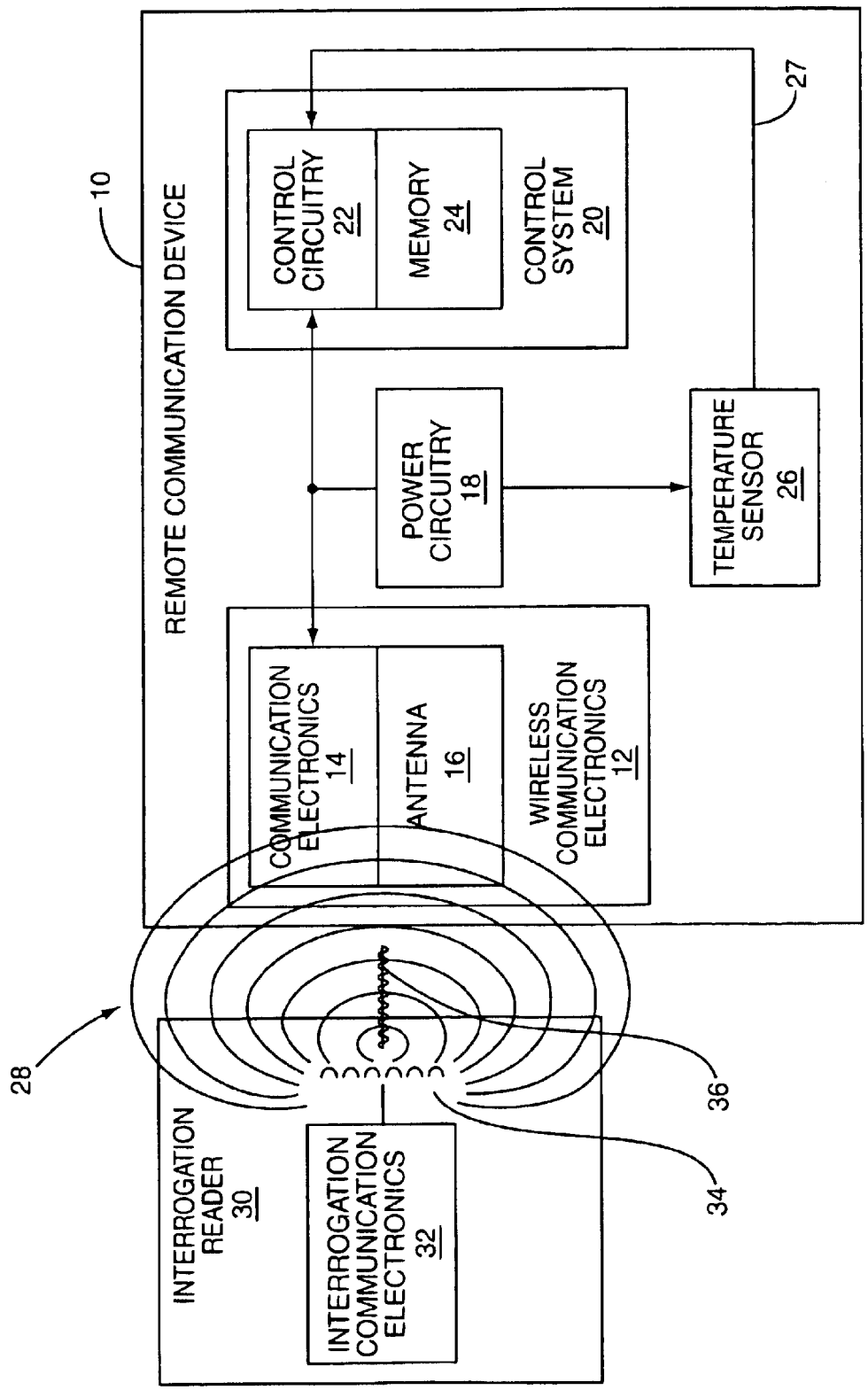
FIG. 1 is a schematic of a remote communication device and an interrogation reader for the preferred embodiment.

Referring now to the drawings in general, it will be understood that the illustrations are for the purpose of describing the preferred embodiment of the invention and are not intended to limit the invention.

FIG. 1 shows a remote communication device, generally designated 10, and the interrogation reader, generally designated 30, according to the present invention. The interrogation reader 30 contains interrogation communication electronics 32 and an interrogation antenna 34. A signal 36 is sent through the interrogation antenna 34 by the interrogation communication electronics 32. The remote communication device 10 contains wireless communication electronics 12 comprising communication electronics 14 and an antenna 16. The remote communication device 10 also contains a control system 20 that contains control circuitry 22 and memory 24. The wireless communication electronics 12 and control circuitry 22 are operatively associated with each other to facilitate communication between the two. The remote communication device 10 additionally includes a temperature sensor 26 that communicates temperature indicia 27 to the control system 20. Lastly, the remote communication device 10 contains power circuitry 18 that stores energy when the remote communication device 10 is in the range of the interrogation reader 30 and provides power to the wireless communication electronics 12, control system 20, and temperature sensor 26 when the remote communication device 10 is not in the range of the interrogation reader 30.

In the preferred embodiment, the remote communication device 10 is a radio frequency transponder. One of ordinary skill in the art will understand that there are many other different types of remote communication devices 10 that allow wireless communication, and the present invention is not limited to any one particular type. The remote communication device 10 is usually made of some type of plastic or other packaging having within it the control system 20 and wireless communication electronics 12. The temperature sensor 26 may also be contained within the remote communication device 10 packaging itself or it may be external to the remote communication device 10. The antenna 16 may either be external or incorporated internally to the remote communication device 10.

The control system 20 is an integrated circuit or other type of microprocessor or micro-controlled electronics that controls the substantive operations of the remote communications device 10. The control system 20 is connected to the wireless communication electronics 12 to communicate and receive transmissions to and from an interrogation reader 30. The control system 20 is also able to store and retrieve information to and from memory 24. The control system 20 and wireless communication electronics 12 in the preferred embodiment are provided in the same integrated circuit package, but one of ordinary skill in the art will recognize that they do not have to be.

FIG. 1 also depicts how communication is achieved with the remote communication device 10. The interrogation reader 30 through its interrogation communication electronics 32 and interrogation antenna 34 communicates to the remote communication device 10 by emitting an electronic signal 36 or other command modulated in a frequency through the interrogation antenna 34. The interrogation antenna 34 may be any type of antenna that can radiate the modulated signal 36 through a magnetic field 28 or other electronic communication field so that a compatible device such as a remote communication device 10 can receive such signal 36 through its own antenna 16. The signal 36 is a message containing information and/or specific instructions for the remote communication device 10. When the antenna 16 is in the presence of the magnetic field 28 emitted by the interrogation reader's 30 antenna 34, the wireless communication electronics 12 are energized thereby energizing the remote communication device 10. The remote communication device 10 remains energized so long as its antenna 16 is in the magnetic field 28 of the interrogation reader 30. The wireless communication electronics 12 demodulate the signal 36 and send the message containing information and/or specific instructions to the control system 20 for appropriate actions. The remote communication device 10 communicates back information to the interrogation reader 30 by altering the contents of the signal 36.

Alternative forms exist for communication with a remote communication device 10. For example, the remote communication device 10 could have a transmitter that is powered by the remote communication device's 10 own power source to send information to the interrogation reader 30 without having to use the signal 36 as a means for communication. The remote communication device 10 in the preferred embodiment contains power circuitry 18 that allows the remote communication device 10 to store and use its own energy to transmit its own signal when not in the range of an interrogation reader 30. It is understood to one of ordinary skill in the art that there are other manners in which to communicate with a remote communication device 10, and that the present invention is not limited to the particular manner described above.

Figure 2:
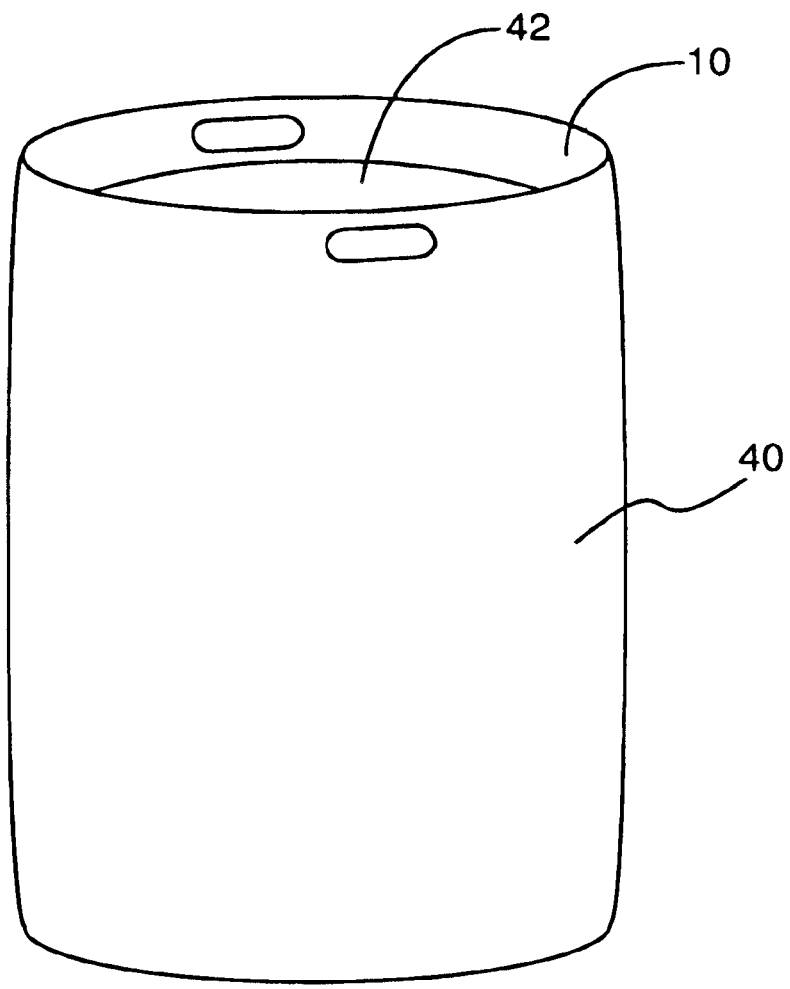
FIG. 2 is a perspective view of the container for the preferred embodiment.

FIG. 2 shows the preferred embodiment of a container 40 that has associated with it the remote communication device 10. In the preferred embodiment, the container 40 is a keg and it contains a specific type of liquid 42, beer; but the container 40 could contain any type of liquid or material desired. The remote communication device 10 is attached to the container 40 so that information specific to the container 40, including temperature indicia about the materials contained in the container 40 and/or the container ID, may be communicated to the interrogation reader 30 when requested and the antenna 34 is the range of the signal 36.

Figure 3:
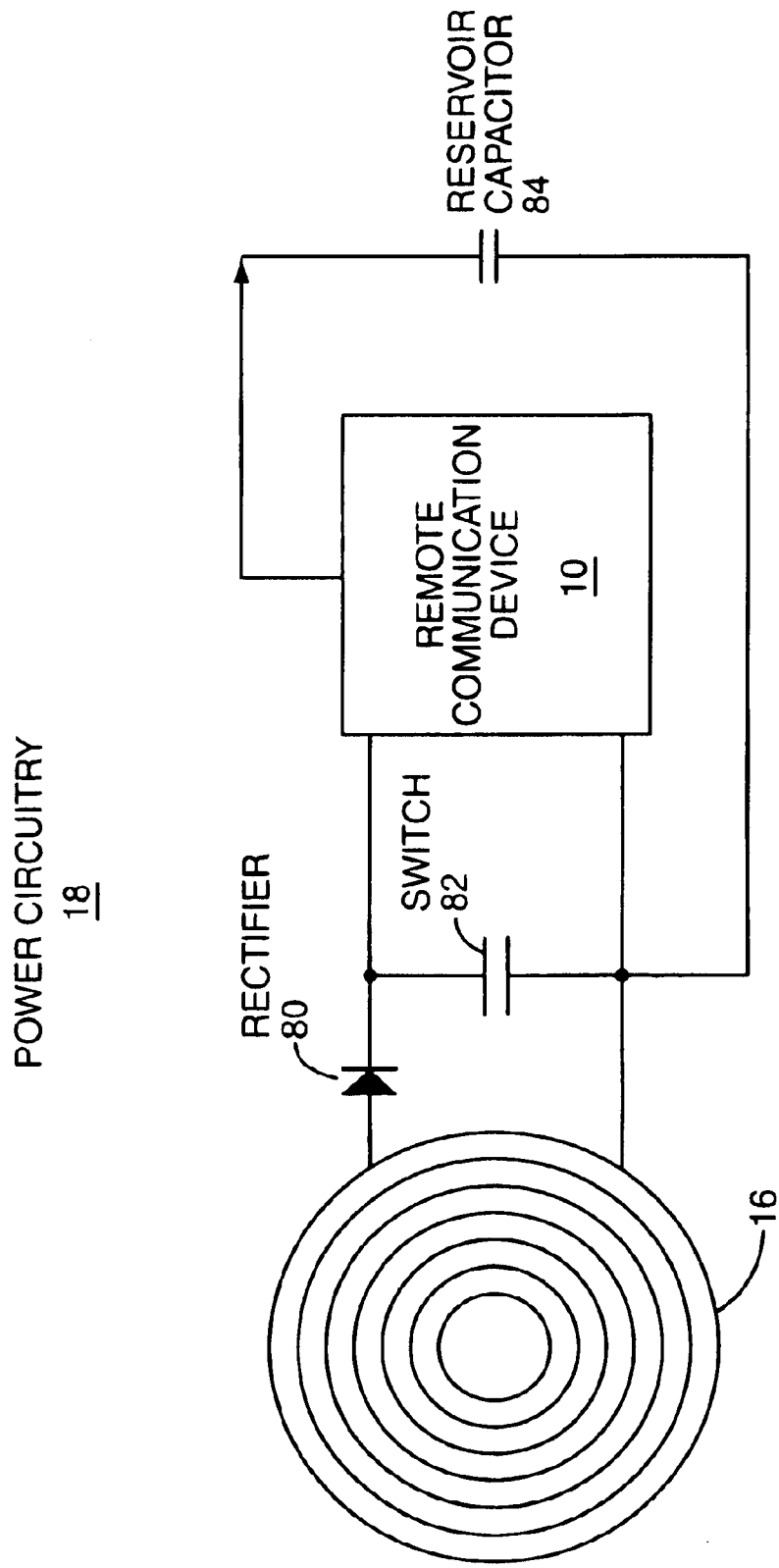
FIG. 3 is a schematic diagram of a power circuit for a remote communication device for the preferred embodiment.

FIG. 3 depicts specifically how the power circuitry 18 is arranged in the preferred embodiment. The present invention allows the remote communication device 10 to perform even when the antenna 16 is not in the range of the signal 36. The remote communication device 10 includes power circuitry 18 that stores energy when the antenna 16 is in the range of the signal 36. When the antenna 16 is not in the range of the signal 36, the remote communication device 10 can continue to operate off of the energy stored by the power circuitry 18.

FIG. 3 shows the preferred manner in which the remote communication device 10 implements power circuitry 18 to accomplish the aforementioned function. It will be understood to a person of ordinary skill in electrical arts that there are other ways to provide the same power circuitry 18 functionality. The remote communication device 10 switches power received by the antenna 16 from a rectifier 80 to the reservoir capacitor 84. The remote communication device 10 pulses the switch 82 between the rectifier 80 and the reservoir capacitor 84 thereby allowing the remote communication device 10 to have power when in the presence of the interrogation reader 30 while also allowing the reservoir capacitor 84 to be charged. When the remote communication device 10 is not in the presence of the interrogation reader 30, the remote communication device 10 receives its power from the energy stored in the reservoir capacitor 84.

The remote communication device 10 has the ability to receive temperature indicia and relay such temperature indicia and an identification associated with the container 40. Temperature indicia determination of the container 40 and/or its contents 42 may be accomplished in different manners. The temperature sensor 26 may be contained within the remote communication device 10, or external to the remote communication device 10. The remote communication device 10 is in thermal contact with the container 40 and/or its contents 42. As the container 40 moves through a facility during storage or processing, the temperature indicia may be obtained by a combination of direct and indirect readings. In any temperature indicia determination method, the temperature indicia of the contents 42 may be communicated to the interrogation reader 30 when desired.

Temperature Technique 1

The remote communication device 10 can determine temperature indicia associated with the container 40 by directly measuring the temperature of the container's liquid contents 42 or indirectly by measuring the temperature of material in thermal contact with the liquid contents 42 or the ambient temperature associated with the container 40. In order for the control system 20 to receive the temperature indicia for the temperature sensor 26, the remote communication device 10 must have a power source.

Temperature Technique 2

Figure 4:
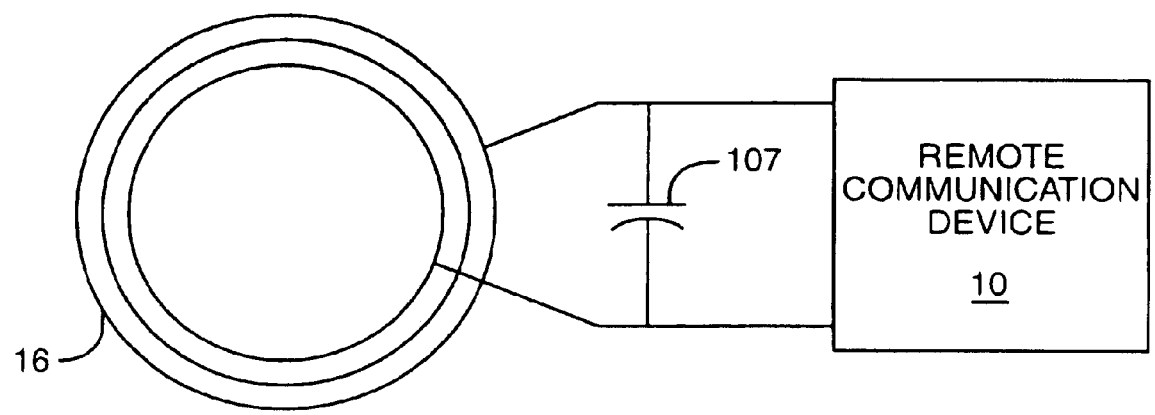
FIG. 4 is a schematic diagram of the transponder arrangement to determine temperature using a discharge capacitor.

FIG. 4 illustrates one design for determining temperature indicia having an antenna coil 16 that is temperature unstable. The temperature unstable antenna coil 16 absorbs energy from the interrogation reader field 28 at a rate relative to the temperature of the remote communication device 10. A capacitor 107, known as a discharge capacitor 107, is connected in parallel with the remote communication device connections to the antenna coil 16. A load is placed in series between the antenna coil 16 and the discharge capacitor 107. When the remote communication device 10 is in the presence of the interrogation reader field 28, the discharge capacitor 107 is charged. The remote communication device 10 determines how much charge is applied to the discharge capacitor 107 and stores it in memory 24. As the container 40 moves away from the interrogation reader field 28, the remote communication device 10 internally keeps track of the elapsed time between the charging of the discharge capacitor 107 and the present time. The discharge rate in the discharge capacitor 107 during the time the container 40 is away from an interrogation reader 30 is related to temperature. For example, the discharge rate of the discharge capacitor 107 at different temperatures may be measured as follows.

| Temperature (Celsius) | Discharge Rate |
|---|---|
| 10 degrees | 0.2 micro Amperes |
| 20 degrees | 0.4 micro Amperes |

When the remote communication device 10 is interrogated by the interrogation reader 30 at a second point, the charge left on the discharge capacitor 107 is used to determine an average temperature during the journey.

Using the integrated discharge rates for the discharge capacitor 107 shown above, the discharge capacitor 107 of 0.1 Farads is charged to 1 Volt at time zero during the remote communication device's 10 first point of interrogation at an interrogation reader 30. Fifty hours later, the remote communication device 10 is interrogated again by a second interrogation reader 30, at which time the remaining charge is 0.064 Coulombs.

Charge in Coulombs (Q) is equal to the capacitance (C) in Farads times volts (V) as shown below:

$$Q=CV$$

Current (I) equals charge (Q) divided by time (t). Assuming a linear current to time ratio, current (I) is equal to the capacitance (C) times collective the initial voltage applied to the capacitor at time zero (Vzero) minus the measure voltage of the capacitor at a time in point later (Vt) divided by time (t) in seconds as shown below:

$$I = \frac{C(Vzero - Vt)}{t}$$

In the particular example above, capacitance C is 0.1 Farads. The initial voltage is 1 Volt. The voltage fifty hours later (Vt) is 0.64 Volts. Time (t) is fifty hours, which is 180,000 seconds. Applying the formula above, current (I) is measured to be 0.2 micro Amperes, which relates to a 10 degree temperature based on the temperature characteristic of the discharge capacitor 107 used for this particular example. If the same discharge occurred over a period of twenty-five hours, the current (I) would be equal to 0.4 micro Amperes, which relates to a 20 degree temperature based on the temperature characteristic of the discharge capacitor 107 used for this particular example.

Figure 5A:
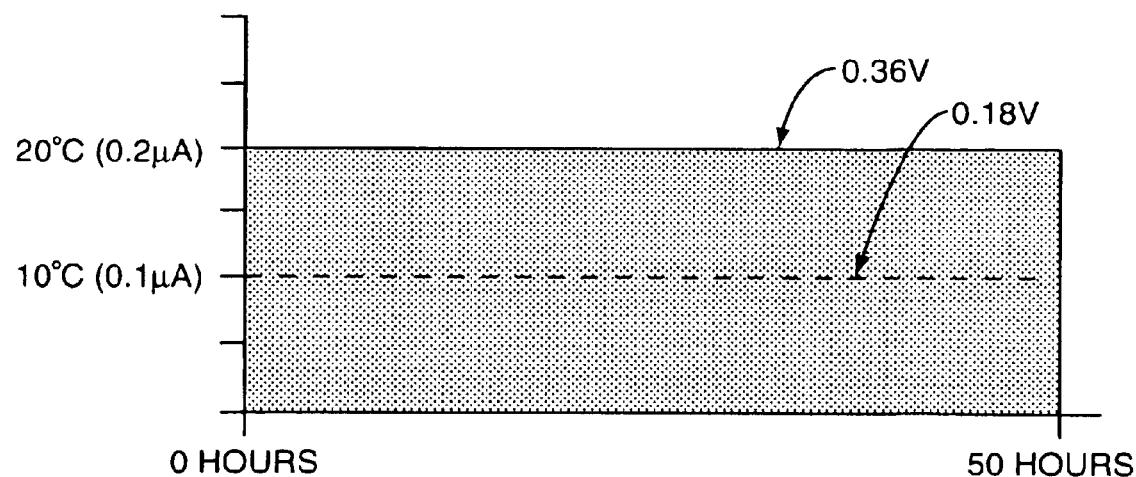
FIG. 5A is a schematic diagram of the discharge capacitor temperature technique for a constant temperature.
Figure 5B:
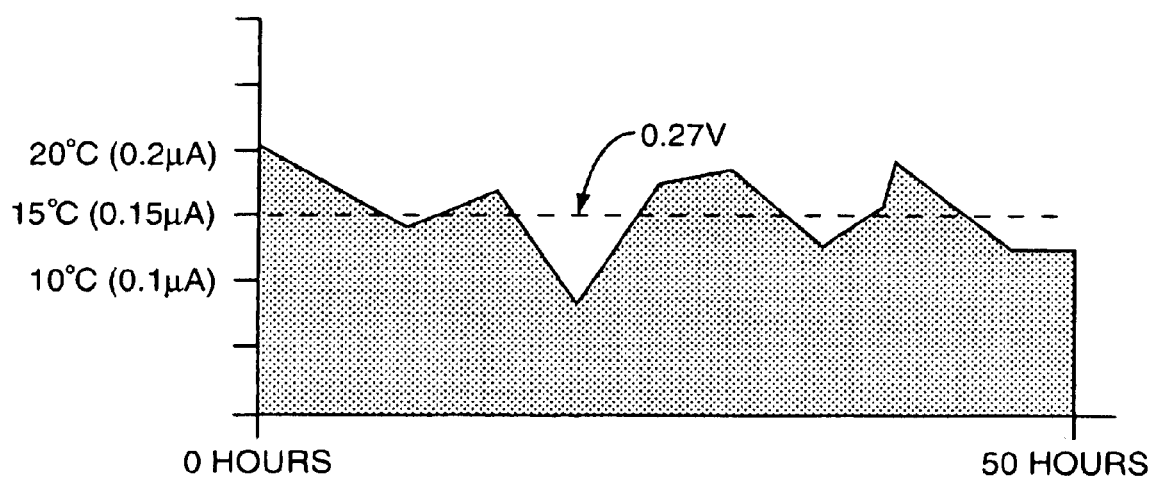
FIG. 5B is a schematic diagram of the discharge capacitor temperature technique for a variable temperature.

FIGS. 5A and 5B show the same discharge technique described above for determining temperature indicia associated with the container 40. Again, the capacitance of the discharge capacitor 107 is 0.1 Farads, the initial voltage is 1 Volt, and the discharge time is fifty hours or 180,000 seconds. FIGS. 5B and 5C show a graphical representation of discharge time versus temperature with the X-axis representing discharge time, and the Y-axis representing amperage and its corresponding temperature that is constant. The total charge (Q) taken from the discharge capacitor 107 is represented by the area under the graph that is the same as the integration of it. In the present example in FIG. 5A, the discharge time is fifty hours and the voltage measured at fifty hours is 0.36 Volts. Using the formula above, the current (I) or the integrated area equaling 0.2 micro Amperes equaling 20 degrees Celsius. Similarly, FIG. 5B shows a fifty hour discharge time with a 0.18 Volts reading at fifty hours equaling a 0.1 micro Amperes equaling 10 degrees Celsius.

FIG. 5B is a graphical representation of a variable temperature during the container's 40 journey. In this example, the total current (I) or integrated area can be compared against a quality factor that is based on time. For example, if the acceptable quality is represented by a total area of less than 0.15 micro Amperes per hour over a fifty hour discharge, a comparison could be made to the actual integrated area to determine if the calculated current (I) is below the 0.15 micro Amperes per hour maximum rating to determine if the derived temperature is acceptable. Similarly, it may be desired that the temperature be acceptable if the area is not more or less than a percentage of an acceptable quality or that it is above a minimum acceptable quality.

With the aforementioned technique for temperature determination, the temperature sensing method is performed without external devices to the remote communication device 10 itself and is therefore particular useful for the present invention in which the remote communication device 10 is mounted inside the ball 26.

Temperature Technique 3

Another technique for sensing the temperature is referred to herein as the energy absorption technique. The first step is determining the frequency at which the remote communication device 10 absorbs maximum energy from the field 28 called the maximum energy absorption frequency. This technique can be used to determine the temperature of the container 40 at interrogation points when the remote communication device 10 is being interrogated by an interrogation reader 30. This technique does not apply to temperature determination while the container 40 is in transit between various interrogation points.

Absorption of energy at a certain frequency is related to the temperature at which the remote communication device 10 is operating. Operating frequency is defined as:

$$\text{Frequency} = \frac{1}{2\pi(LC)^{1/2}}$$

L represents the inductance of the antenna coil 16, and C represents the capacitance of the capacitor 107. At initialization of the remote communication device 10, the interrogation reader 30 emits varying frequencies to determine the maximum energy absorption frequency. During the initialization, the temperature is known by interrogation reader 30. Once the maximum energy absorption frequency is determined, the interrogation reader 30 communicates the actual temperature being measured by the interrogation reader 30, along with the maximum energy absorption frequency of the remote communication device 10, to the remote communication device 10 for storage in memory 24. The interrogation reader 30 can determine the maximum energy absorption frequency of the remote communication device 10 in a number of ways, such as determining when there is a voltage drop at the antenna 34 of the interrogation reader 30.

At a later point in time when the remote communication device 10 is within the interrogation reader field 28, the interrogation reader 30 interrogates the remote communication device 10 and determines its maximum energy absorption frequency at that time again. The interrogation reader 30 also retrieves the calibrated temperature and maximum absorption frequency previously stored within the remote communication device 10.

A temperature can be determined as a function of the maximum operation frequency of the remote communication device 10. A characteristic curve between the maximum energy absorption frequencies of the remote communication device 10 and temperatures is calculated and loaded into the interrogation readers 30 before operation. Once maximum energy absorption frequency is determined, the interrogation reader 30 matches it with the corresponding temperature. A look-up table may be provided in the remote communication device 10 that correlates a maximum energy absorption frequency with a particular temperature.

There are other methods that can correlate the maximum energy absorption frequency to the temperature of the remote communication device 10 that are known to one of ordinary skill in the art, and the present invention is not limited to any one particular method.

There are two basic modes of operation in which the remote communication device 10 can receive temperature indicia from the temperature sensor 26: periodic and threshold.

FIG. 6 contains a schematic of the container ID 52, the configuration data 54, and the threshold temperature setting 50. The container ID 52, the threshold temperature setting 50, and the configuration data 54 are each a byte in the memory 24 in the preferred embodiment. The container ID 52 contains a unique identification indicia that can be communicated by the remote communication device 10 to an interrogation reader 30 to uniquely identify the container 40 that the remote communication device 10 and temperature indicia 27 measured are associated with. The configuration data 54 contains the specific configuration about the manner in which the remote communication device 10 is to operate with respect to temperature measurements received by the control system 20 from the temperature sensor 26. The threshold temperature setting 50 contains the temperature setting to which the temperature indicia 27 is compared to determine if the temperature indicia 27 has either fallen below or exceeded the desired setting, depending on the setting in the configuration data 54.

In order to configure the remote communication device 10 to perform as desired, it is necessary to store initial configuration data 54 and container ID 52 by placing either the remote communication device 10, before becoming associated with the container, in the range of an interrogation reader 30 or by placing the container 10 associated with the remote communication device 10 in the range of an interrogation reader 30 as previously discussed for data transfer. If the remote communication device 10 is already associated with the container 40, then the container 40 with the remote communication device 10 is placed in the range of the interrogation reader 30 to perform such operations.

Periodic temperature indicia can be received by the remote communication device 10 and communicated to the interrogation reader 30 when the remote communication device 10 is in the range of the interrogation reader 30 so that the temperature indicia 27 is known for different points of time in the past. There are different modes of operation for periodic operation. The remote communication device 10 transmits the periodic temperature indicia 27 so that the temperature indicia 27 is known for different points of time in the past. The periodic temperature indicia 27 can also be transmitted immediately or when the remote communication device 10 is in the range of the interrogation reader 30. If it is desired for the remote communication device 10 to receive temperature indicia 27 on a periodic basis, the periodic bit 60 is set to "on" or binary "1". If periodic temperature indicia 27 is not desired, the periodic bit 60 is set to the "off" or binary "0". The periodic historical bit 62 is turned "on" or set to binary "1" if the remote communication device 10 should keep on a historical basis received temperature indicia 27, or is turned "off" or set to binary "0" if the remote communication device 10 should not on a historical basis received temperature indicia 27.

The remote communication device 10 can also be configured to communicate and/or store the temperature indicia 27 when it either exceeds a maximum or falls below a minimum threshold temperature setting 50. The threshold temperature setting 50 is compared with the temperature indicia 27 received to determine if the threshold temperature setting 50 has been exceeded. The configuration data 54 contains three bits for threshold operation. The threshold minimum/maximum bit 76 is set to establish whether or not the remote communication device 10 should determine if the temperature indicia 27 has either fallen below the threshold temperature setting 50 or exceeded the temperature threshold setting 50 respectively. It should be understood to one of ordinary skill in the art that a remote communication device 10 could perform both a minimum and maximum threshold operation and not just one or the other as in the preferred embodiment.

If the remote communication device 10 determines that the temperature indicia 27 has fallen below the minimum or exceeded the maximum threshold temperature setting 50, then the remote communication device 10 can either communicate such occurrence or store the occurrence in memory 24.

If the threshold communicate bit 72 is turned "on" or set to binary "1", the remote communication device 10 will continue to communicate the threshold crossover occurrence until the remote communication device 10 is in the range of an interrogation reader 30. If the threshold communicate bit 72 is turned "off" or set to binary "0", the remote communication device 10 will not continue to communicate the threshold crossover occurrence until the remote communication device 10 is in the range of an interrogation reader 30. If the threshold store memory bit 74 is turned "on" or set to binary "1", the remote communication device 10 will record a threshold crossover occurrence in memory 24 until desired and when the remote communication device 10 is in the range of an interrogation reader 30. If the threshold store memory bit 74 is turned "off" or set to binary "0", the remote communication device 10 will not continue to record a threshold crossover occurrence in memory.

FIGS. 7-10 contain flowcharts detailing the general operation of the remote communication device 10, how the remote communication device 10 communicates information back to the interrogation reader 30, and the periodic operation and threshold operations of the remote communication device 10.

Figure 7:
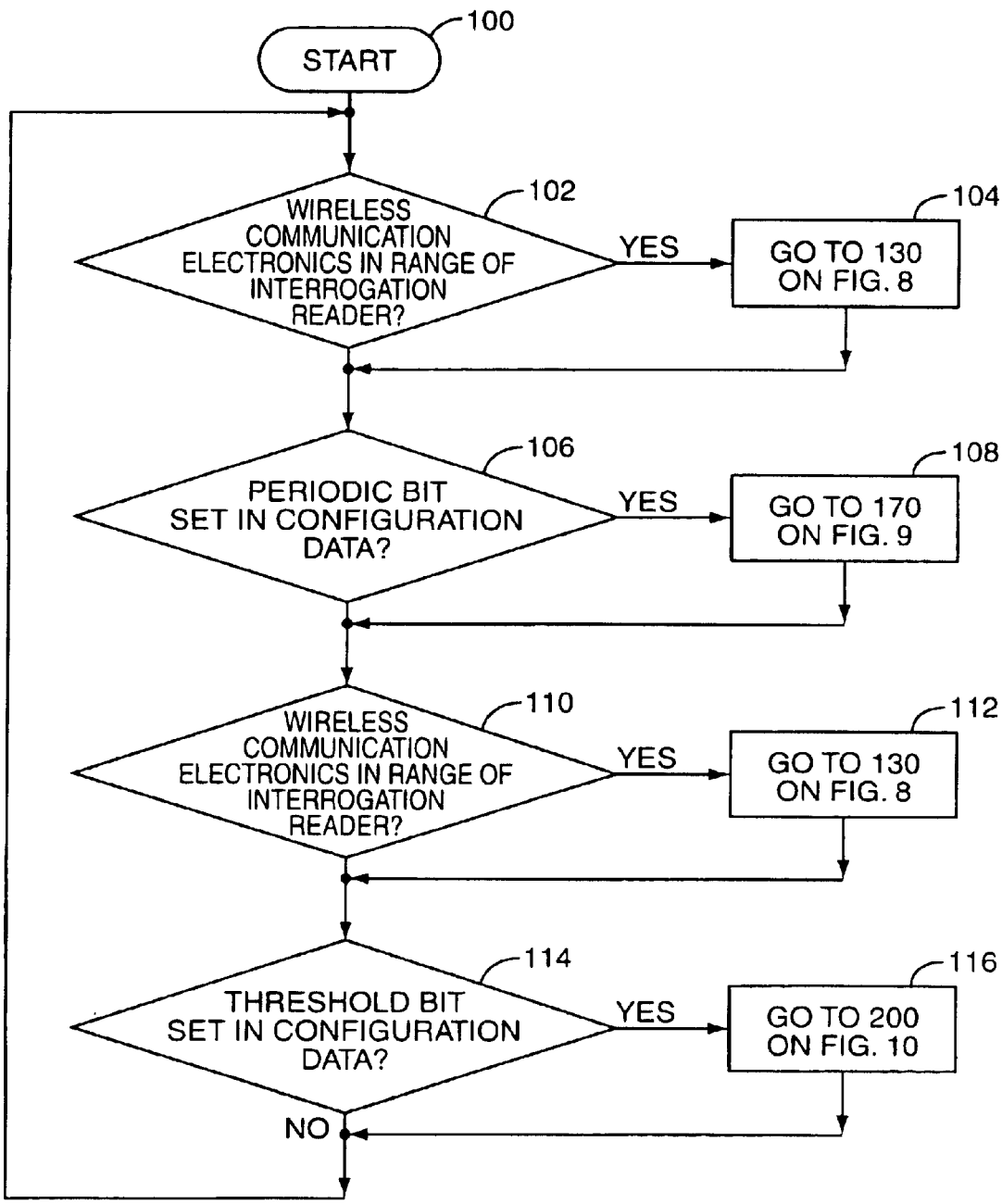
FIG. 7 is a flowchart of general operation for the preferred embodiment.
Figure 8:
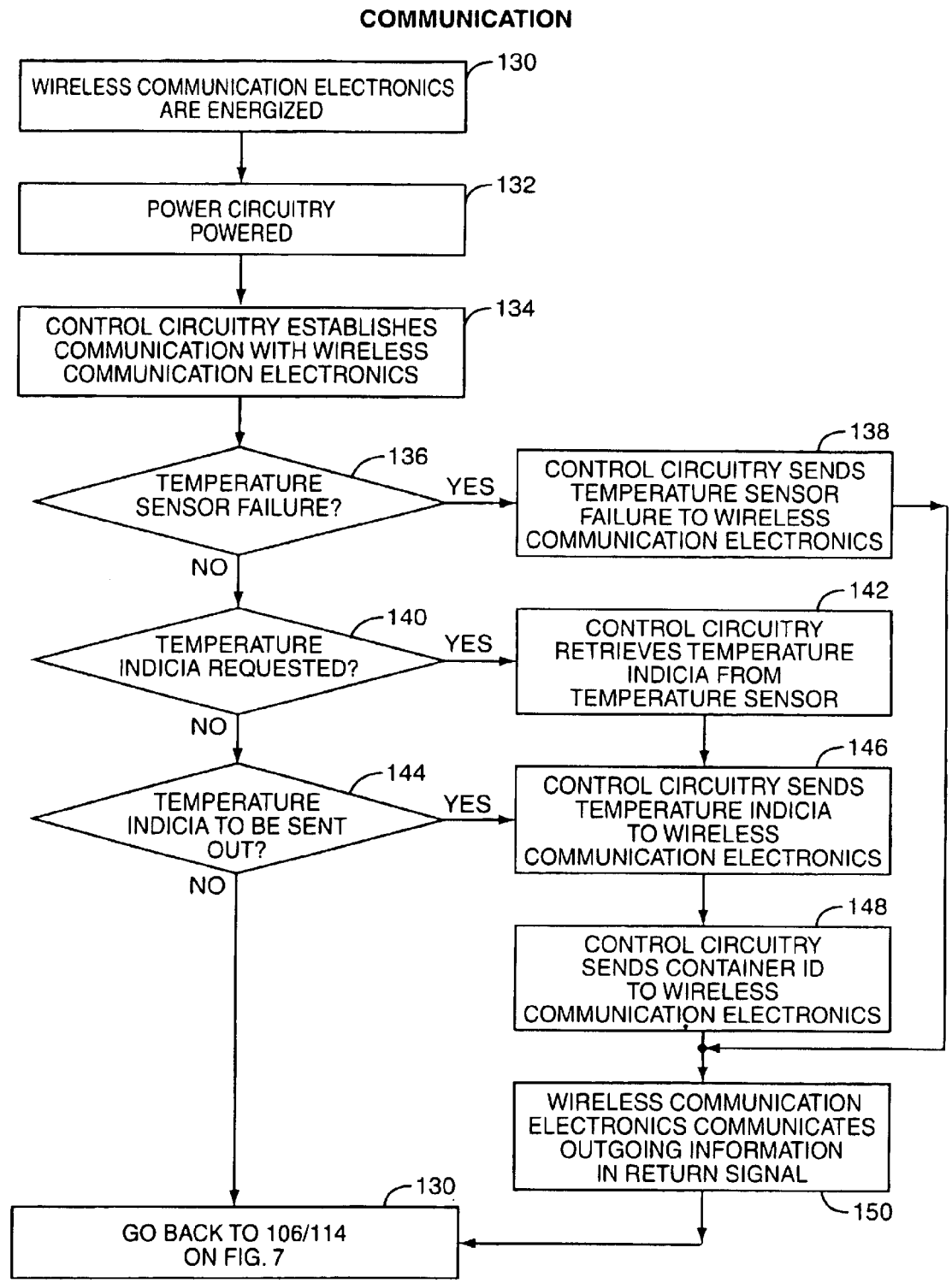
FIG. 8 is a flowchart for the remote communication device communicating to an interrogation reader for the preferred embodiment.

FIG. 7 shows the general operation of the remote communication device 10. The process begins at 100. In decision 102, the control system 20 determines if the wireless communication electronics 12, and in particular if its antenna 16, is in the range of the interrogation reader 30. If the answer is yes, control is passed to 104 to perform the communication function in FIG. 8 in step 130. If the answer is no, control is passed to decision 106. Whenever the communication operation in FIG. 8 is completed, control is also passed to decision 106 as well. In decision 106, the control system 20 determines if the periodic bit 60 is set in the configuration data 54. If so, control is passed to perform the periodic function in FIG. 9 in step 170 and then returns back to decision 110 when completed. If the answer is no, control is passed to decision 110. In decision 110, the control system 20 determines if the wireless communication electronics 12, and specifically its antenna 16, is in the range of the interrogation reader 30. If so, control is passed to step 112 to perform the communication operation in FIG. 8 in step 130. When completed, control is passed to decision 114. If not, the communication operation in 112 is bypassed and the operation goes directly to decision 114. In decision 114, the control system 20 determines if the threshold bit 70 is set in the configuration data 54. If so, control is passed to FIG. 10 in step 200 to perform the threshold operation of the system. When completed, control is passed back to the beginning to decision 102. If not, the threshold operation in FIG. 10 is not performed and control is passed back to decision 102 at the start of the process.

FIG. 8 shows the communication operation of the remote communication device 10. The communications operation is performed in the general operation in FIG. 7 in steps 102, 110 after both the periodic operation 106 and the threshold operation 114 are performed. In step 130, the wireless communication electronics 12 are energized due to the antenna 16 being in the range of the interrogation reader 30 and its signal 36. In step 132, the power circuitry 18 is powered by the control system 20 switching the power received by antenna 16 between the remote communication device 10 and the reservoir capacitor 84. Next, in step 134, the control circuitry 22 establishes communication with the wireless communication electronics 12. In step 136, the control system 20 determines if the temperature sensor 26 has failed. If it has, the control circuitry 22 sends the indication of the temperature sensor's 26 failure to the wireless communication electronics 12 in step 138 and the wireless communication electronics 12 communicates the temperature sensor's 26 failure in the return signal 36 to the interrogation reader 30 in step 150. Control is then passed back to the general operation in FIG. 7 in step 106/114. If the temperature sensor 26 has not failed in step 136, step 140 is performed whereby the control system 20 determines if temperature indicia 27 is being requested by the interrogation reader 30 through its signal 36. If so, the control circuitry 22 retrieves the temperature indicia 27 from the temperature sensor 26 in step 142. In step 146, the control circuitry 22 sends the temperature indicia 27 to the wireless communication electronics 12. The control circuitry 22 also sends the container ID 52 stored in memory 24 to the wireless communication electronics 12 in step 148; and in step 150, the wireless communication electronics 12 communicate with the container ID 52 and the temperature indicia 27 received from the temperature sensor 26 to the interrogation reader 30 through the return signal 36. Control is then returned back to the general operation in FIG. 7 in step 106/114. If the temperature indicia 27 is not requested in decision 140, the process goes to decision 144 to determine if the temperature indicia 27 is to be sent out. The control circuitry 22 determines if any temperature indicia 27 stored in memory 24 should be communicated to the interrogation reader 30. If so, step 146 provides that the control circuitry 30 sends the temperature indicia 27 received from the temperature sensor 26 to the wireless communication electronics 12. In step 148, the control circuitry 22 sends the container ID 52 additionally to the wireless communication electronics 12. In step 150, the wireless communication electronics 12 communicates both the temperature indicia 27 stored in memory 24 and the container ID 52 in the return signal 36 back to the interrogation reader 30. Control is returned back to the general operation in FIG. 7 in step 106/114 depending on the entry point into the communication operation in FIG. 7. If the temperature indicia 27 is not stored to be sent out in decision 144, control is returned back to FIG. 7 in step 106/114.

Figure 9:
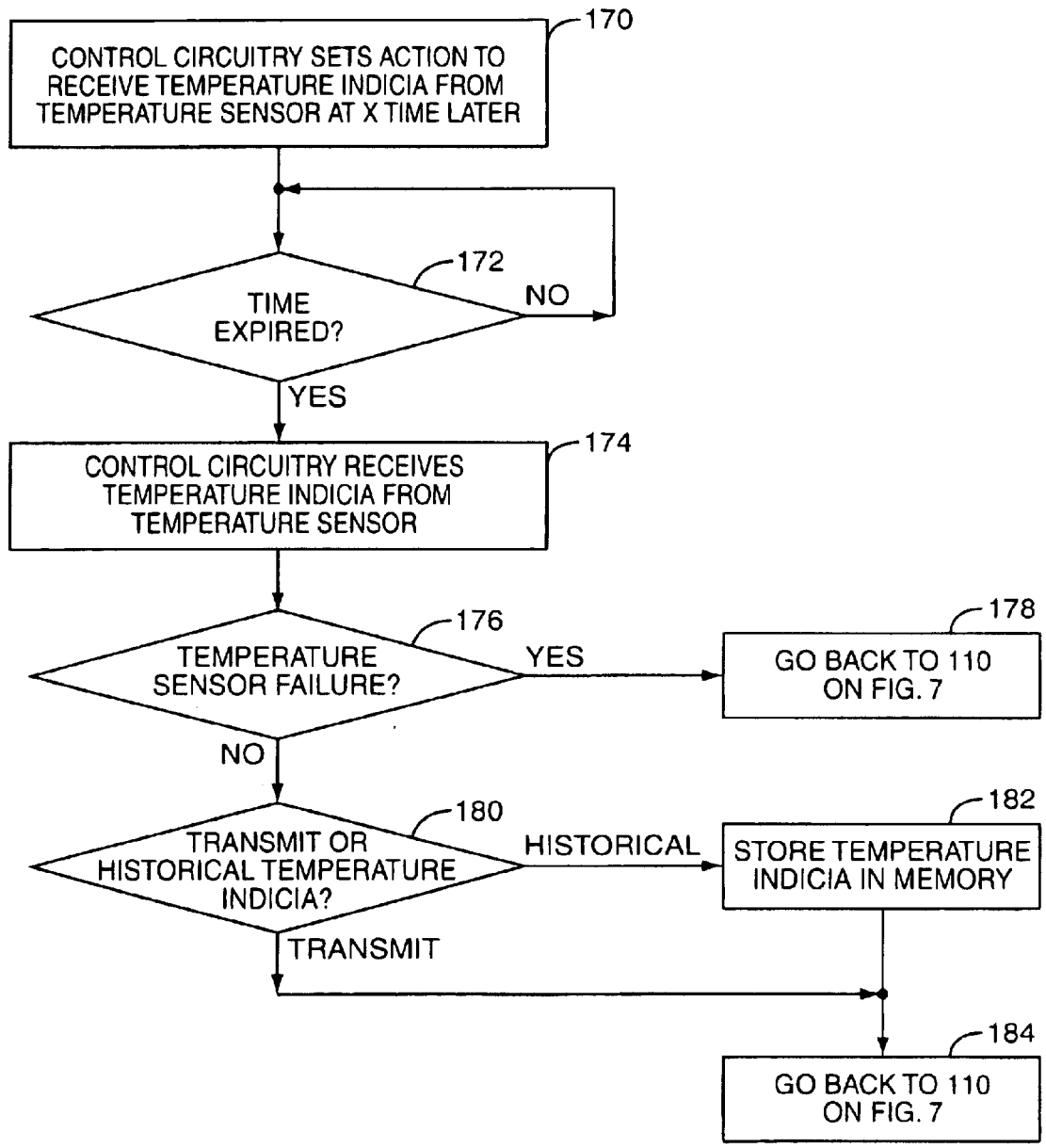
FIG. 9 is a flowchart of the periodic operation for the preferred embodiment.

FIG. 9 contains the periodic operation of the remote communication device 10. At step 170, the control circuitry 22 sets an action item to receive temperature indicia 27 from the temperature sensor 26 at a point later in time. In decision 172, the control circuitry 22 determines if the time to receive the temperature indicia 27 has expired. If the answer is no, control is passed back to decision 172, and the inquiry in decision 172 is repeated again. If the time has expired in decision 172, the process moves to step 174, and the control circuitry 22 receives the temperature indicia 27 from the temperature sensor 26. In decision 176 the control circuitry 22 determines if the temperature sensor 26 has failed. If the answer is yes, control is passed to step 178 to return back to general operations in FIG. 7 in step 110 so that the failure can be communicated to an interrogation reader 30 when a remote communication device 10 is in its range. If the temperature sensor 26 has not failed in decision 176, control is passed to decision 180, and the configuration data 54 is checked to see if the periodic communicate bit 64 is set or the periodic historical bit 62 is set. If the periodic historical bit 62 is set, control is passed to step 182 whereby the temperature indicia 27 is stored in memory 24; control is then passed back to the general operations in FIG. 7 in step 110. If in decision 180 the periodic communicate bit 64 is set, control passes straight to step 184 to return back to the general operations in FIG. 7 in step 110 so that the temperature indicia 27 is communicated by the remote communication device 10 to the interrogation reader 30 when in its range.

Figure 10:
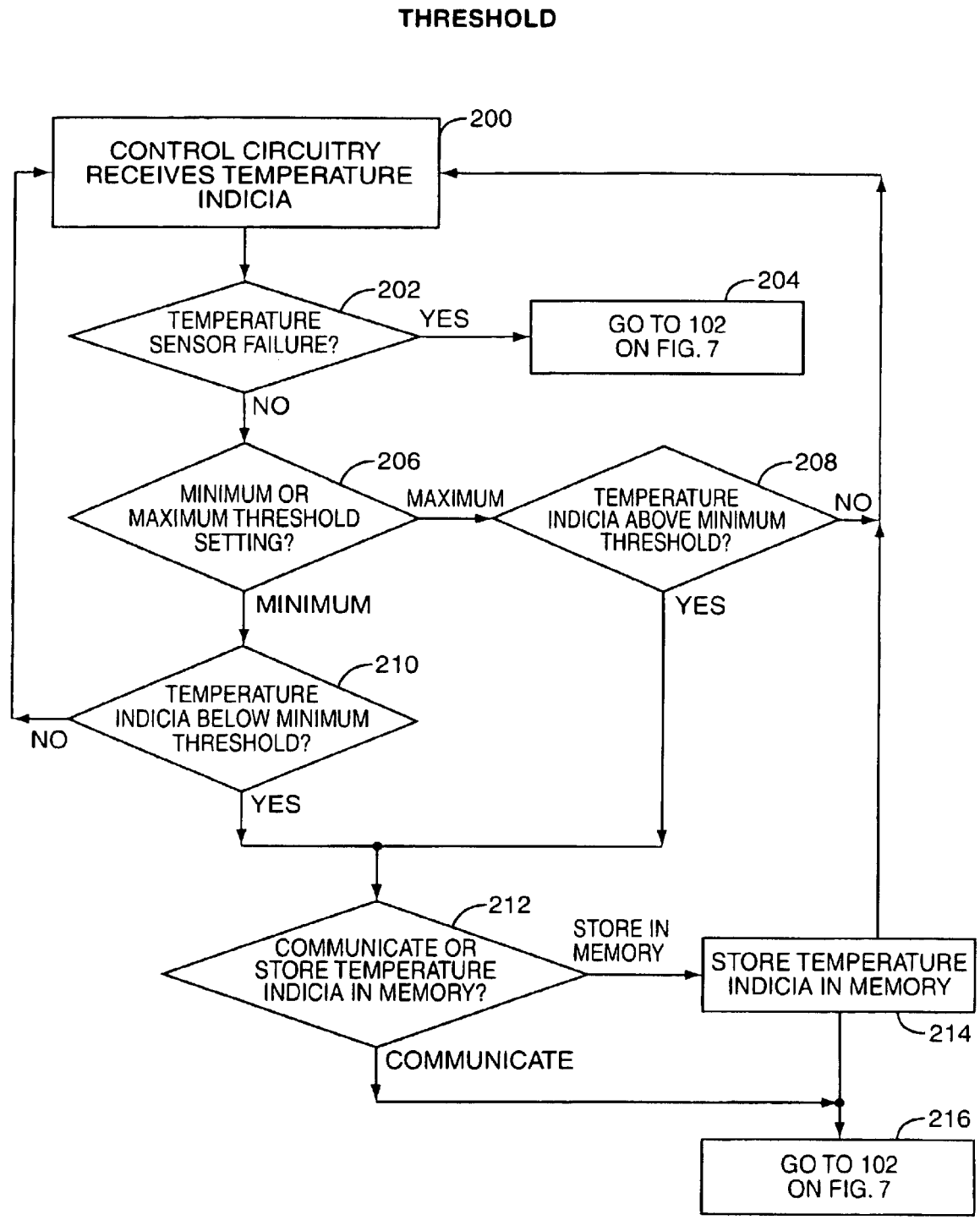
FIG. 10 is a flowchart of the threshold operation for the preferred embodiment.

FIG. 10 shows the threshold operation of the remote communication device 10. In step 200, control circuitry 22 receives the temperature indicia 27 from the temperature sensor 26. Next in decision 202, the control circuitry 22 determines if the temperature sensor 26 has failed. If so, control is passed to step 204 whereby process is returned back to the general operations in FIG. 7 in step 102 so that the temperature sensor's 26 failure can be communicated by the remote communication device 10 to an interrogation reader 30 when in its range. If the answer to decision 202 is no, indicating that there is not a temperature sensor 26 failure, control is passed to decision 206 whereby the control system 20 determines if the threshold minimum/maximum bit 76 is set for minimum or maximum. If the minimum/maximum threshold bit 76 is set to maximum, control is passed to decision 208 whereby the control system 20 determines if the temperature indicia 27 has exceeded the maximum threshold stored in the threshold temperature setting byte 50. If it has not, process control is passed back to step 200 to continue threshold operation. If it has, control is passed to decision 212. Likewise, if in decision 206 the minimum/maximum threshold bit 76 is set to minimum, the control system 20 determines if the temperature indicia 27 has fallen below the minimum threshold setting by comparing it to the threshold setting byte 50. If it has not, control is passed back to step 200 to continue threshold operation. If it has, control is passed to decision 212. In decision 212, the control system 20 determines if the threshold occurrence should be stored in memory 24. If so, step 214 stores the temperature indicia 27 in memory 24, and control is passed back to 216 to general operations in FIG. 7 in step 102 so that the stored temperature indicia 27 in memory 24 can be communicated by the remote communication device 10 to interrogation reader 30 when in its range. If in decision 212 the control system 20 determines that the threshold store memory bit 74 is set, control is passed to step 216 to return back to general operations in FIG. 7 in step 102 whereby such temperature indicia 27 will be communicated by the remote communication device 10 to an interrogation reader 30 when in its range.

Figure 11:
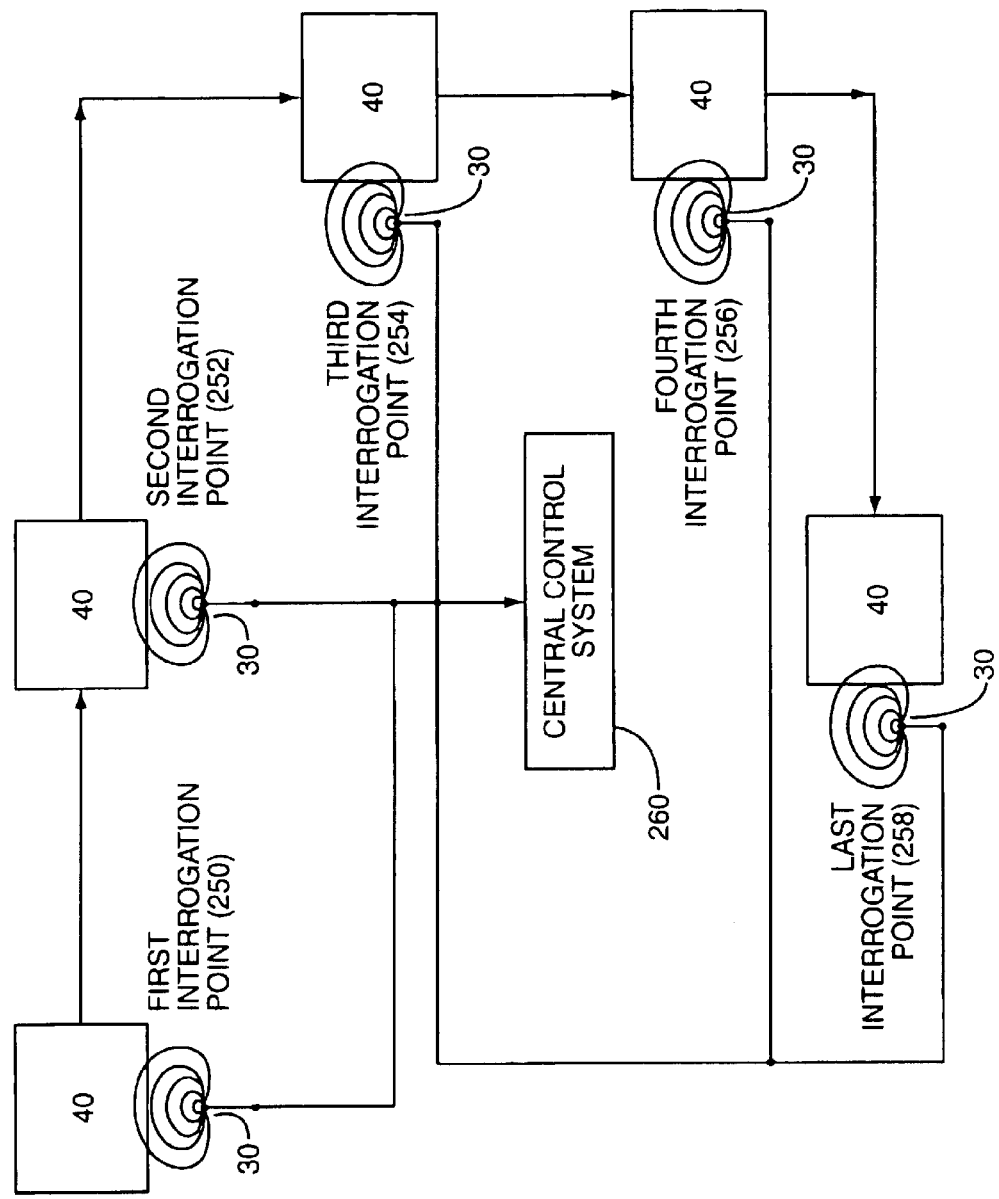
FIG. 11 is a schematic of a tracking system for containers having associated with them remote communication devices.

FIG. 11 illustrates a particular tracking system in which containers 40 that contain remote communication devices 10 can be tracked with corresponding identification indicia, such as a container ID 52, and temperature indicia 27 through an environment such as manufacturing, distribution, or shipping facility. For example, the remote communication device 10 connected to container 40 could pass a first interrogation point 250 that includes an interrogation reader 30. When the container 40 and its associated remote communication device 10 is in the presence of the interrogation reader 30, a message is transferred concerning temperature indicia 27 and the container ID 52. This process continues as the container 40 moves to a second interrogation point 252, a third interrogation point 254, a fourth interrogation point 256, and so on to a last interrogation point 258.

A central control system 260 is provided that centrally maintains the information received from the interrogation readers 40 concerning a container's 40 particular container ID 52 and temperature indicia 27 and monitors the movement of the container 40 through the facility. The information received by each of the interrogation readers 40 may be forwarded to the central control system 260 either through direct wire, LAN connection, or other communication network. There are other implementations of tracking systems that are apparent to those of ordinary skill in the art. The present invention is not limited to the preferred manner described above.

There are other manners in which that preferred embodiment of the present invention can be implemented that are obvious to one of ordinary skill in the art. As such, the present invention is not limited to the particular manner of the preferred embodiment.

What is claimed is:

1. A device for measuring information associated w a container, wherein a remote communication device is attached to the container for measuring the temperature associated with the container and communicating identification in indicia and temperature indicia associated with the container to a reader, said device comprising:
    (a) a remote communication device attached to the container, said remote communication device including a control system and wireless communication electronics;
    (b) a temperature sensor operatively associated with said remote communication device; and
    (c) said control system adapted to receive temperature indicia associated with the container from said temperature sensor and to communicate said temperature indicia and an identification indicia associated with the container to an interrogation reader through said wireless communication electronics;
    said control system receives temperature indicia when it exceeds a threshold setting.

2. The device of claim 1, wherein said control system receives temperature indicia periodically.

3. The device of claim 2, wherein said control system keeps a history of said periodic temperature indicia and communicates said history of said periodic temperature indicia to said interrogation reader at a later time.

4. The device of claim 2, wherein said control system communicates said periodic temperature indicia immediately when said remote communication device is in the range of said interrogation reader.

5. The device of claim 1, wherein said threshold setting is a maximum threshold setting.

6. The device of claim 1, wherein said threshold setting is a minimum threshold setting.

7. The device of claim 1, wherein said control system stores said temperature indicia in excess of a threshold setting and communicates said temperature indicia in excess of a threshold setting stored to said interrogation reader at a later time.

8. The device of claim 1, wherein said control system communicates said temperature indicia in excess of a threshold setting immediately when said remote communication device is in the range of said interrogation reader.

9. The device of claim 1, wherein said remote communication device includes a power circuitry to store energy when in the range of said interrogation reader to power to said remote communication device when said remote communication device is not in the range of said interrogation reader.

10. The device of claim 1, wherein said remote communication device determines said temperature indicia due to said temperature sensor being in thermal contact with the container.

11. The device of claim 1, wherein said remote communication device includes a temperature unstable antenna coil and a discharge capacitor associated with said remote communication device to determine temperature indicia associated with the container.

12. The device of claim 11, wherein said interrogation reader charges said discharge capacitor at a first time instant wherein said remote communication device determines the remaining charge of said discharge capacitor at a second time instant to determine temperature indicia associated with said remote communication device based remaining charge of said discharge capacitor.

13. The device of claim 11, wherein said remote communication device uses a lookup-table to correlate remaining charge to said temperature indicia.

14. The device of claim 11, wherein said remote communication device uses a characteristic curve to correlate remaining charge to said temperature indicia.

15. The device of claim 11, wherein said remote communication device communicates said temperature indicia to said interrogation reader if the remaining charge is below a predetermined value.

16. The device of claim 11, wherein said remote communication device communicates said temperature indicia to said interrogation reader if the remaining charge is above a predetermined value.

17. The device of claim 1, wherein said interrogation reader determines a maximum energy absorption frequency of said remote communication device to determine said temperature indicia corresponding to said energy absorption frequency of said remote communication device.

18. The device of claim 17, wherein said interrogation reader uses a look-up table to correlate said maximum energy absorption frequency to said temperature indicia.

19. The device of claim 17, wherein said interrogation reader uses a characteristic curve to correlate said maximum energy absorption frequency to said temperature indicia.

20. The device of claim 1, wherein said control system detects a failure in said temperature sensor and communicates said failure when said remote communication device is in range of said interrogation reader.

21. A device for measuring information associated with a container, wherein a remote communication device is attached to the container for measuring a temperature indicia associated with the container and communicating the identification indicia and the temperature indicia associated with the container to an interrogation reader, said device comprising:
    (a) a container;
    (b) a remote communication device attached to said container, said remote communication device including a control system and wireless communication electronics;
    (c) a temperature sensor operatively associated with said remote communication device; and
    (d) said control system adapted to receive the temperature indicia associated with said container from said temperature sensor and to communicate the temperature indicia and an identification indicia associated with said container to an interrogation reader through said wireless communication electronics;
    said control system receives the temperature indicia when it exceeds a threshold setting.

22. The device of claim 21, wherein said control system receives the temperature indicia periodically.

23. The device of claim 22, wherein said control system keeps a history of said periodic temperature indicia and communicates said history of said periodic temperature indicia to said interrogation reader at a later time.

24. The device of claim 22, wherein said control system communicates said periodic temperature indicia immediately when said remote communication device is in the range of said interrogation reader.

25. The device of claim 21, wherein said threshold setting is a maximum threshold setting.

26. The device of claim 21, wherein said threshold setting is a minimum threshold setting.

27. The device of claim 21, wherein said control system stores the temperature indicia in excess of a threshold setting and communicates said stored temperature indicia in excess of a threshold setting to said interrogation reader at a later time.

28. The device of claim 21, wherein said control system immediately communicates the temperature indicia in excess of a threshold setting when said remote communication device is in the range of said interrogation reader.

29. The device of claim 21, wherein said remote communication device includes a power circuitry to store energy when in the range of said interrogation reader to power said remote communication device when said remote communication device is not in the range of said interrogation reader.

30. The device of clam 21, wherein said remote communication device determines the temperature indicia due to said temperature sensor being in thermal contact with said container.

31. The device of claim 21, wherein said remote communication device includes a temperature unstable antenna coil and a discharge capacitor associated with said remote communication device to determine the temperature indicia associated with said container.

32. The device of claim 31, wherein said interrogation reader charges said discharge capacitor at a first time instant wherein said remote communication device determines the remaining charge of said discharge capacitor at a second time instant to determine the temperature indicia associated with said remote communication device based on the remaining charge of said discharge capacitor.

33. The device of claim 31, wherein said remote communication device uses a lookup-table to correlate remaining charge to the temperature indicia.

34. The device of claim 31, wherein said remote communication device uses a characteristic curve to correlate remaining charge to the temperature indicia.

35. The device of claim 31, wherein said remote communication device communicates the temperature indicia to said interrogation reader if the remaining charge is below a predetermined valve.

36. The device of claim 31, wherein said remote communication device communicates the temperature indicia to said interrogation reader if the remaining charge is above a predetermined valve.

37. The device of claim 21, wherein said interrogation reader determines a maximum energy absorption frequency of said remote communication device to determine a liquid temperature indicia corresponding to said energy absorption frequency of said remote communication device.

38. The device of claim 37, wherein said interrogation reader uses a look-up table to correlate said maximum energy absorption frequency to the temperature indicia.

39. The device of claim 37, wherein said interrogation reader uses a characteristic curve to correlate said maximum energy absorption frequency to the temperature indicia.

40. The device of claim 21, wherein said control system detects a failure in said temperature sensor and communicates said failure when said remote communication device is in range of said interrogation reader.

41. The device of claim 21, wherein said temperature sensor measures the temperature indicia concerning a liquid contained inside said container.

42. The device of claim 41, wherein said liquid is beer.

43. A device for measuring temperature associated with a container, said device comprising:
  (a) a remote communication device attached to the container, said remote communication device including a control system and wireless communication electronics;
  (b) a temperature sensor operatively associated with said remote communication device to transmit a temperature indicia periodically to said control system; and
  (c) said control system adapted to communicate said temperature indicia to an interrogation reader through said wireless communication electronics;
  said remote communication device includes a temperature unstable antenna coil and a discharge capacitor associated with said remote communication device to determine said temperature indicia associated with said container.

44. The device of claim 43, wherein said control system keeps a history of said periodic temperature indicia and communicates said history of said periodic temperature indicia to said interrogation reader at a later time.

45. The device of claim 43, wherein said control system communicates said periodic temperature indicia immediately when said remote communication device is in the range of said interrogation reader.

46. The device of claim 43, wherein said control system additionally communicates an identification indicia associated with the container to said interrogation reader.

47. The device of claim 43, wherein said remote communication device includes a power circuitry to store energy when in the range of said interrogation reader to power to said remote communication device when said remote communication device is not in the range of said interrogation reader.

48. The device of claim 43, wherein said remote communication device determines said temperature indicia due to said temperature sensor being in thermal contact with said container.

49. The device of claim 43, wherein said interrogation reader charges said discharge capacitor at a first time instant wherein said remote communication device determines the remaining charge of said discharge capacitor at a second time instant to determine said temperature indicia associated with said remote communication device based remaining charge of said discharge capacitor.

50. The device of claim 43, wherein said remote communication device uses a lookup-table to correlate remaining charge to said temperature indicia.

51. The device of claim 43, wherein said remote communication device uses a characteristic curve to correlate remaining charge to said temperature indicia.

52. The device of claim 43, wherein said remote communication device communicates said temperature indicia to said interrogation reader if the remaining charge is below a predetermined valve.

53. The device of claim 43, wherein said remote communication device communicates said temperature indicia to said interrogation reader if the remaining charge is above a predetermined valve.

54. The device of claim 43, wherein said interrogation reader determines a maximum energy absorption frequency of said remote communication device to determine a liquid temperature indicia corresponding to said energy absorption frequency of said remote communication device.

55. The device of claim 54, wherein said interrogation reader uses a look-up table to correlate said maximum energy absorption frequency to said temperature indicia.

56. The device of claim 54, wherein said interrogation reader uses a characteristic curve to correlate said maximum energy absorption frequency to said temperature indicia.

57. The device of claim 43, wherein said control system detects a failure in said temperature sensor and communicates said failure when said remote communication device is in range of said interrogation reader.

58. A device for measuring temperature associated with a container, said device comprising:
   (a) a remote communication device attached to the container, said remote communication device including a control system and wireless communication electronics;
   (b) a temperature sensor operatively associated with said remote communication device to transmit a temperature indicia when in excess of a threshold setting to said control system; and
   (c) said control system adapted to communicate said temperature indicia to an interrogation reader through said wireless communication electronics.

59. The device of claim 58, wherein said control system stores said temperature indicia in excess of a threshold setting and communicates said temperature indicia to said interrogation reader at a later time.

60. The device of claim 59, wherein said control system communicates said temperature indicia in excess of a threshold setting immediately when said remote communication device is in the range of said interrogation reader.

61. The device of claim 59, wherein said control system additionally communicates an identification indicia associated with the container to said interrogation reader.

62. The device of claim 58, wherein said remote communication device includes a power circuitry to store energy when in the range of said interrogation reader to power to said remote communication device when said remote communication device is not in the range of said interrogation reader.

63. The device of claim 58, wherein said control system detects a failure in said temperature sensor and communicates said failure when said remote communication device is in range of said interrogation reader.

64. A method of tracking a container wherein a remote communication device is attached to the container for measuring said temperature indicia associated with the container and communicating identification indicia and said temperature indicia associated with the container to an interrogation reader, comprising the steps of:
   (a) providing a remote communication device having a control system and a wireless communication electronics;
   (b) sensing a temperature indicia associated with the container through use of a temperature sensor;
   (c) communicating said temperature indicia and an identification indicia associated with the container to an interrogation reader through said wireless communication electronics; and
   (d) receiving said temperature indicia when it exceeds a threshold setting.

65. The method of claim 64, wherein step (c) further includes determining said temperature indicia through thermal contact between said temperature sensor and the container.

66. The method of claim 64, wherein step (c) further includes determining said temperature indicia by determining the discharge in a discharge capacitor associated with said remote communication device.

67. The method of claim 66, wherein step (c) further includes charging said discharge capacitor at a first time instant and determining the remaining charge of said discharge capacitor at a second time instant to determine said temperature indicia associated with said remote communication based on remaining charge of said discharge capacitor.

68. The method of claim 66, wherein step (c) further includes correlating remaining charge in said discharge capacitor to said temperature indicia by using a look-up table.

69. The method of claim 66, wherein step (c) further includes correlating remaining change in said discharge capacitor to said temperature indicia using a characteristic curve.

70. The method of claim 66, wherein step (c) further includes communicating said temperature indicia to said interrogation reader if the remaining charge is below a predetermined value.

71. The method of claim 66, wherein step (c) further includes communicating said temperature indicia to said interrogation reader if the remaining charge is above a predetermined value.

72. The method of claim 64, wherein step (c) further includes determining a maximum energy absorption frequency of said remote communication device to determine a liquid temperature indicia corresponding to said energy absorption frequency of said remote communication device.

73. The method of claim 72, wherein step (c) further includes correlating said maximum energy absorption frequency to said temperature indicia using a look-up table.

74. The method of claim 72, wherein step (c) further includes correlating said maximum energy absorption frequency to said temperature indicia using a characteristic curve.

75. The method of claim 64, wherein step (b) is performed periodically.

76. The method of claim 64, further comprising the step of keeping a history of said periodic temperature indicia and communicating said history of said periodic temperature indicia to said interrogation reader at a later time.

77. The method of claim 64, further comprising the step of communicating said periodic temperature indicia immediately when said remote communication device is in the range of said interrogation reader.

78. The method of claim 64, wherein said step of receiving said temperature indicia when it exceeds a threshold setting occurs when said temperature indicia exceeds a maximum threshold setting.

79. The method of claim 64, further comprising the step of storing said temperature indicia in excess of a threshold setting and communicating said temperature indicia in excess of a threshold setting stored to said interrogation reader at a later time.

80. The method of claim 64, further comprising the step of immediately communicating said temperature indicia in excess of a threshold setting when said remote communication device is in the range of said interrogation reader.

81. The method of claim 64, further comprising the step of storing energy when said remote communication device is in the range of said interrogation reader to power said remote communication device when said remote communication device is not in the range of said interrogation reader.

82. The method of claim 64, further comprising the step of detecting a failure in said temperature sensor and communicating said failure when said remote communication device is in range of said interrogation reader.

83. The method of claim 64, further comprising the step of tracking the containers at a plurality of interrogation points to receive said temperature indicia and an identification indicia associated with the container.

84. A device for measuring information associated with a container, wherein a remote communication device is attached to the container for measuring the temperature indicia associated with the container and communicating identification indicia and temperature indicia associated with the container to a reader, said device comprising:
 (a) a means for wireless communication attached to the container;
 (b) a means for sensing the temperature indicia associated with the container; and
 (c) said means for wireless communication communicating the temperature indicia along with a means for uniquely identifying the container to an interrogation reader;
 wherein the temperature indicia is also communicated by said means for wireless communication if the temperature indicia exceeds a threshold setting.

85. The device of claim 84, wherein said means for sensing the temperature indicia is performed periodically.

86. The device of claim 84, wherein said means for wireless communication further includes a means for powering said means for wireless communication when said means for wireless communication is in the range of said interrogation reader to power to said means for wireless communication when said means for wireless communication is not in the range of said interrogation reader.

87. An improved container for use in a radio frequency identification system for tracking containers, comprising a container for transporting a liquid and a transponder integrally mounted to said container for transmitting unique identification indicia for use in identifying said container and the temperature indicia associated with said container, the temperature indicia reflecting the temperature indicia monitored during transport, wherein said remote communication device is further configured to periodically determine the temperature indicia associated with said container during transport, determine if said temperature indicia is passed a defined limit and transmit a signal indicating said stored temperature indicia has past a defined limit along with said identification indicia when said remote communication device is interrogated.

88. The improved container of claim 87, wherein said remote communication device is further configured to periodically monitor and store the temperature indicia during transport and transmit said stored the temperature indicia along with said identification indicia when said remote communication device is interrogated.

89. The improved container of claim 88, wherein said remote communication device is further configured to create a historical record of the periodically monitored temperature indicia and transmit said historical record when said remote communication device is interrogated.

90. A device for measuring information associated with a container, wherein a remote communication device is attached to the container for measuring the temperature associated with the container and communicating identification indicia and temperature indicia associated with the container to a reader, said device comprising:
 (a) a remote communication device attached to the container, said remote communication device including a control system and wireless communication electronics;
 (b) a temperature sensor operatively associated with said remote communication device; and
 (c) said control system adapted to receive temperature indicia associated with the container from said temperature sensor and to communicate said temperature indicia and an identification indicia associated with the container to an interrogation reader through said wireless communication electronics;
 said remote communication device includes a power circuitry to store energy when in the range of said interrogation reader to power to said remote communication device when said remote communication device is not in the range of said interrogation reader.

91. The device of claim 90, wherein said control system receives temperature indicia periodically.

92. The device of claim 91, wherein said control system keeps a history of said periodic temperature indicia and communicates said history of said periodic temperature indicia to said interrogation reader at a later time.

93. The device of claim 91, wherein said control system communicates said periodic temperature indicia immediately when said remote communication device is in the range of said interrogation reader.

94. A device for measuring information associated with a container, wherein a remote communication device is attached to the container for measuring the temperature associated with the container and communicating identification indicia and temperature indicia associated with the container to a reader, said device comprising:
 (a) a remote communication device attached to the container, said remote communication device including a control system and wireless communication electronics;
 (b) a temperature sensor operatively associated with said remote communication device; and
 (c) said control system adapted to receive temperature indicia associated with the container from said temperature sensor and to communicate said temperature indicia and an identification indicia associated with the container to an interrogation reader through said wireless communication electronics;
 said remote communication device includes a temperature unstable antenna coil and a discharge capacitor associated with said remote communication device to determine temperature indicia associated with the container.

95. The device of claim 94, wherein said interrogation reader charges said discharge capacitor at a first time instant wherein said remote communication device determines the remaining charge of said discharge capacitor at a second time instant to determine temperature indicia associated with said remote communication device based remaining charge of said discharge capacitor.

96. The device of claim 94, wherein said remote communication device uses a lookup-table to correlate remaining charge to said temperature indicia.

97. The device of claim 94, wherein said remote communication device uses a characteristic curve to correlate remaining charge to said temperature indicia.

98. The device of claim 94, wherein said remote communication device communicates said temperature indicia to said interrogation reader if the remaining charge is below a predetermined value.

99. The device of claim 94, wherein said remote communication device communicates said temperature indicia to said interrogation reader if the remaining charge is above a predetermined value.

100. A device for measuring information associated with a container, wherein a remote communication device is attached to the container for measuring the temperature associated with the container and communicating identification indicia and temperature indicia associated with the container to a reader, said device comprising:
  (a) a remote communication device attached to the container, said remote communication device including a control system and wireless communication electronics; and
  (b) a temperature sensor operatively associated with said remote communication device;
  (c) said control system adapted to receive temperature indicia associated with the container from said temperature sensor and to communicate said temperature indicia and an identification indicia associated with the container to an interrogation reader through said wireless communication electronics; and
  said interrogation reader determines a maximum energy absorption frequency of said remote communication device to determine said temperature indicia corresponding to said energy absorption frequency of said remote communication device.

101. The device of claim 100, wherein said interrogation reader uses a look-up table to correlate said maximum energy absorption frequency to said temperature indicia.

102. The device of claim 100, wherein said interrogation reader uses a characteristic curve to correlate said maximum energy absorption frequency to said temperature indicia.

103. A device for measuring temperature associated with a container, said device comprising:
  (a) a remote communication device attached to the container, said remote communication device including a control system and wireless communication electronics;
  (b) a temperature sensor operatively associated with said remote communication device to transmit a temperature indicia periodically to said control system; and
  (c) said control system adapted to communicate said temperature indicia to an interrogation reader through said wireless communication electronics;
  said remote communication device includes a power circuitry to store energy when in the range of said interrogation reader to power to said remote communication device when said remote communication device is not in the range of said interrogation reader.

104. The device of claim 103, wherein said control system keeps a history of said periodic temperature indicia and communicates said history of said periodic temperature indicia to said interrogation reader at a later time.

105. The device of claim 103, wherein said control system communicates said periodic temperature indicia immediately when said remote communication device is in the range of said interrogation reader.

106. The device of claim 103, wherein said control system additionally communicates an identification indicia associated with the container to said interrogation reader.

107. The device of claim 103, wherein said remote communication device includes a power circuitry to store energy when in the range of said interrogation reader to power to said remote communication device when said remote communication device is not in the range of said interrogation reader.

108. The device of claim 103, wherein said remote communication device determines said temperature indicia due to said temperature sensor being in thermal contact with said container.

109. A device for measuring temperature associated with a container, said device comprising:
  (a) a remote communication device attached to the container, said remote communication device including a control system and wireless communication electronics;
  (b) a temperature sensor operatively associated with said remote communication device to transmit a temperature indicia periodically to said control system; and
  (c) said control system adapted to communicate said temperature indicia to an interrogation reader through said wireless communication electronics;
  said interrogation reader determines a maximum energy absorption frequency of said remote communication device to determine a liquid temperature indicia corresponding to said energy absorption frequency of said remote communication device.

110. The device of claim 109, wherein said interrogation reader uses a look-up table to correlate said maximum energy absorption frequency to said temperature indicia.

111. The device of claim 109, wherein said interrogation reader uses a characteristic curve to correlate said maximum energy absorption frequency to said temperature indicia.

112. A method of tracking a container wherein a remote communication device is attached to the container for measuring said temperature indicia associated with the container and communicating identification indicia and said temperature indicia associated with the container to an interrogation reader, comprising the steps of:
  (a) providing a remote communication device having a control system and a wireless communication electronics;
  (b) sensing a temperature indicia associated with the container through use of a temperature sensor; and
  (c) communicating said temperature indicia and an identification indicia associated with the container to an interrogation reader through said wireless communication electronics, and determining said temperature indicia by determining the discharge in a discharge capacitor associated with said remote communication device.

113. The method of claim 112, wherein step (c) further includes charging said discharge capacitor at a first time instant and determining the remaining charge of said discharge capacitor at a second time instant to determine said temperature indicia associated with said remote communication based on remaining charge of said discharge capacitor.

114. The method of claim 112, wherein step (c) further includes correlating remaining charge in said discharge capacitor to said temperature indicia by using a look-up table.

115. The method of claim 112, wherein step (c) further includes correlating remaining change in said discharge capacitor to said temperature indicia using a characteristic curve.

116. The method of claim 112, wherein step (c) further includes communicating said temperature indicia to said interrogation reader if the remaining charge is below a predetermined value.

117. The method of claim 12, wherein step (c) further includes communicating said temperature indicia to said interrogation reader if the remaining charge is above a predetermined value.

118. A method of tracking a container wherein a remote communication device is attached to the container for measuring said temperature indicia associated with the container and communicating identification indicia and said temperature indicia associated with the container to an interrogation reader, comprising the steps of:

(a) providing a remote communication device having a control system and a wireless communication electronics;

(b) sensing a temperature indicia associated with the container through use of a temperature sensor; and (c) communicating said temperature indicia and an identification indicia associated with the container to an interrogation reader through said wireless communication electronics, and determining a maximum energy absorption frequency of said remote communication device to determine a liquid temperature indicia corresponding to said energy absorption frequency of said remote communication device.

119. The method of claim 118, wherein step (c) further includes correlating said maximum energy absorption frequency to said temperature indicia using a look-up table.

120. The method of claim 118, wherein step (c) further includes correlating said maximum energy absorption frequency to said temperature indicia using a characteristic curve.

121. A method of tracking a container wherein a remote communication device is attached to the container for measuring said temperature indicia associated with the container and communicating identification indicia and said temperature indicia associated with the container to an interrogation reader, comprising the steps of:

(a) providing a remote communication device having a control system and a wireless communication electronics;

(b) sensing a temperature indicia associated with the container through use of a temperature sensor;

(c) communicating said temperature indicia and an identification indicia associated with the container to an interrogation reader through said wireless communication electronics; and (d) storing energy when said remote communication device is in the range of said interrogation reader to power said remote communication device when said remote communication device is not in the range of said interrogation reader.

* * * * *